US008663593B2

(12) United States Patent
Yoo et al.

(10) Patent No.: US 8,663,593 B2
(45) Date of Patent: Mar. 4, 2014

(54) METHOD FOR FABRICATING THREE DIMENSIONAL GRAPHENE STRUCTURES USING CATALYST TEMPLATES

(75) Inventors: Jibeom Yoo, Seongnam-si (KR); Shashikant P. Patole, Suwon-si (KR); Hyunmyoung Lee, Incheon (KR)

(73) Assignee: Research and Business Foundation Sungyunkwan University, Suwon-Si (KR)

( * ) Notice: Subject to any disclaimer, the term of this patent is extended or adjusted under 35 U.S.C. 154(b) by 0 days.

(21) Appl. No.: 13/298,752

(22) Filed: Nov. 17, 2011

(65) Prior Publication Data

US 2012/0128573 A1 May 24, 2012

(30) Foreign Application Priority Data

Nov. 19, 2010 (KR) .......................... 10-2010-0115542

(51) Int. Cl.
*D01C 5/00* (2006.01)
(52) U.S. Cl.
USPC ..................... 423/447.3; 423/447.1; 977/734; 977/742
(58) Field of Classification Search
USPC ......... 423/447.1, 447.3, 445 B; 977/742, 743
See application file for complete search history.

(56) References Cited

U.S. PATENT DOCUMENTS

| 7,459,013 B2* | 12/2008 | Holmes et al. ................... 96/132 |
| 2007/0218202 A1* | 9/2007 | Ajayan et al. ............... 427/249.1 |
| 2008/0292835 A1* | 11/2008 | Pan et al. ......................... 428/98 |
| 2009/0160799 A1* | 6/2009 | Jiang et al. ..................... 345/173 |
| 2010/0101710 A1* | 4/2010 | Choi et al. ..................... 156/230 |
| 2010/0171093 A1* | 7/2010 | Kabir ............................... 257/10 |
| 2010/0172818 A1* | 7/2010 | Lin et al. ........................ 423/460 |

OTHER PUBLICATIONS

M. Chowalla et al. J. Appl. Phys. 90, 5308 (2001); http://dx.doi.org/10.1063/1.1410322 (10 pages) Growth process conditions of vertically aligned carbon nanotubes using plasma enhanced chemical vapor deposition.*
Diameter-Controlled Synthesis of Carbon Nanotubes Chin Li Cheung, Andrea Kurtz, Hongkun Park and Charles M. Lieber The Journal of Physical Chemistry B 2002 106 (10), 2429-2433.*
Control of Carbon Capping for Regrowth of Aligned Carbon Nanotubes Joseph F. AuBuchon,Li-Han Chen, and, and Sungho Jin The Journal of Physical Chemistry B 2005 109 (13), 6044-6048.*

* cited by examiner

*Primary Examiner* — Stanley Silverman
*Assistant Examiner* — Richard M Rump
(74) *Attorney, Agent, or Firm* — Pearne & Gordon LLP

(57) ABSTRACT

There is provided a method for fabricating a three dimensional graphene structure using a catalyst template, in which the three dimensional graphene structure in various forms can be obtained through a simple process by using a metal catalyst in various forms as a template and growing graphene thereon. There is also provided a method for controlling length of a three dimensional graphene structure to be from a few nanometers to a few millimeters by controlling length of the metal catalyst template.

9 Claims, 1 Drawing Sheet

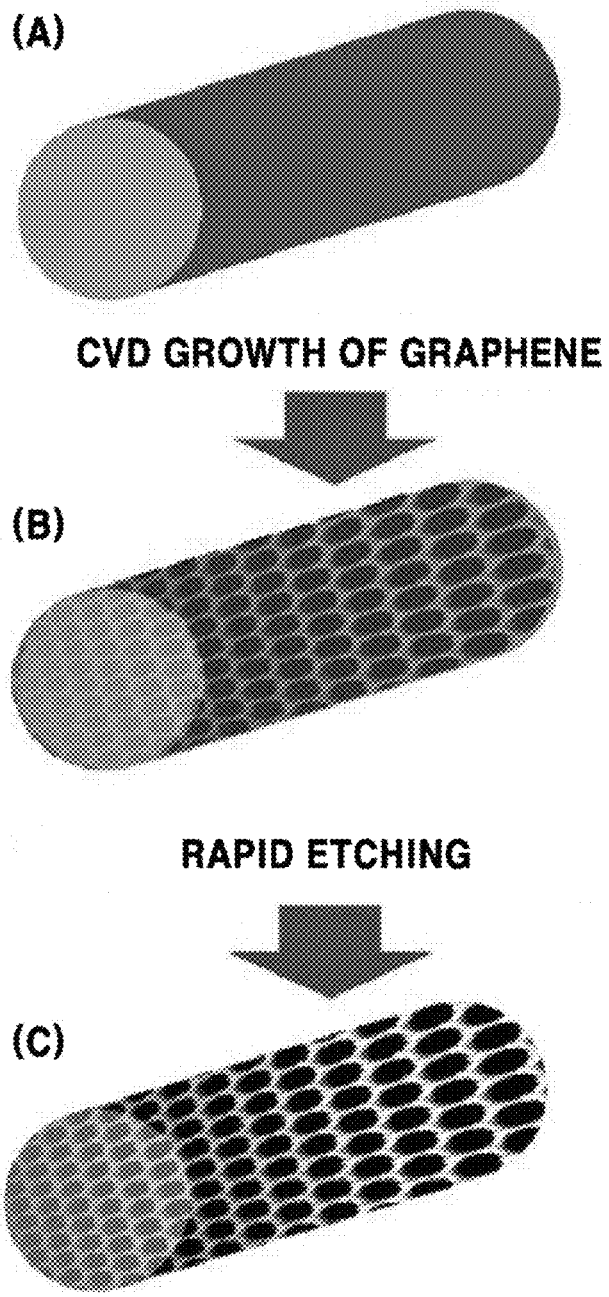

METHOD FOR FABRICATING THREE DIMENSIONAL GRAPHENE STRUCTURES USING CATALYST TEMPLATES

CROSS-REFERENCE TO RELATED APPLICATION

This application claims the benefit of Korean Patent Application No. 10-2010-0115542 filed on Nov. 19, 2010, the entire disclosures of which are incorporated herein by reference.

FIELD OF THE INVENTION

The present disclosure relates to a method for fabricating a three dimensional graphene structure using a catalyst template, in which the three dimensional graphene structure is fabricated through a simple and effective fabrication process using a metal catalyst in a certain form as a template, and can be applied to various technical fields.

BACKGROUND OF THE INVENTION

Graphene means a single layer of $sp^2$-bonded carbon atoms, and is a quasi-two dimensional material. Graphene has attracted great interests due to its unique band structure and physical properties. Graphene has excellent properties such as quantum electron transfer, an adjustable band gap, an extremely high mobility, a high elasticity, and electro-mechanical variation. Since the first discover of separated graphene that is fabricated by a mechanical exfoliation of a graphite crystal, various chemical approaches for synthesizing a large scale of graphene, including a two dimensional assembling of reduced graphene oxides and an epitaxial growth on a silicon carbide and ruthenium as well as an exfoliated graphene sheet, have been developed. A process for surface precipitation of carbons in transition metal can also form graphene structures. From recent developments in synthesis of a large scale of a graphene film on a nickel layer and a copper layer through a chemical vapor deposition method, and a subsequent etching method for removing a catalyst layer, it is expected that graphene structures will be useful for various macroscopic application such as a transparent conductive film which is flexible and tensible and can be used for an electronic device.

CVD growth of graphene on a copper foil has been known as being advantageous in terms of controlled thickness and quality, and an etching and transferring method useful and effective for an practical fabrication scale (Science 324, 1312, 2009). However, there has been limit in fabricating three dimensional graphene structures in various forms.

BRIEF SUMMARY OF THE INVENTION

The object of the present disclosure is to provide a method for effectively fabricating various three dimensional graphene structures using a metal catalyst as a template through a chemical vapor deposition method.

Another object of the present disclosure is to provide a method for controlling length of a three dimensional graphene structure by controlling length of a metal catalyst template.

In order to accomplish the objects, the present disclosure provides a method for fabricating a three dimensional graphene structure, including: a step of growing graphene on a metal catalyst template in a certain form; and a step of removing the template by dissolving the template on which graphene has grown, in an etching solvent.

The present disclosure also provides a method for controlling length of a three dimensional graphene structure, including a step of controlling length of a metal catalyst template, for growing graphene on the metal catalyst template in a certain form.

According to the present disclosure, it is possible to obtain three dimensional graphene structures in various forms through a simple process by using a metal catalyst in various forms as a template to grow graphene thereon.

According to the present disclosure, it is possible to control length of the three dimensional graphene structure to be from a few nanometers to a few millimeters by controlling length of the metal catalyst template.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which:

FIG. 1 illustrates a process for fabricating a three dimensional graphene tube using a catalyst template according to one example of the present disclosure.

DETAILED DESCRIPTION OF THE INVENTION

Hereinafter, the configuration of the present disclosure will be described in detail.

The present disclosure relates to a method for fabricating a three dimensional graphene structure, including: a step of growing graphene on a metal catalyst template in a certain form; and a step of removing the template by dissolving the template on which graphene has grown, in an etching solvent.

The present disclosure has been made to overcome problems in conventional complicated processes for forming templates on substrates and growing graphene having a three dimensional structure thereon by using metal catalysts. The present disclosure provides a method for a fabricating three dimensional graphene structure through a simple and fast process using a metal catalyst in a certain form as a substrate and template for graphene growth.

For the method for growing graphene on the metal catalyst template, a chemical vapor deposition method may be used, but the growing method may not be limited thereto.

One embodiment of the graphene growth will be described below. The graphene may grow through the following steps: a step of providing a metal catalyst template in a certain form for graphene growth; a step of placing the metal catalyst template in a CVD (Chemical Vapor Deposition) furnace; a step of heating the furnace to a certain temperature at a constant heating rate; a step of supplying a mixed gas of a carbon-containing gas and a protecting gas into the furnace; and a step of growing graphene on the metal catalyst template by controlling a partial pressure of the carbon-containing gas to be less than 1 torr.

The catalyst template may be in a tube, a rod, a sphere, a cube, a coil, or a cuboid shape, or other shape in a length from a few nanometers to a few millimeters. However, the shape of the template may not be limited thereto.

For the metal catalyst, one or at least two of transition metals such as Cu, Ni, Co, and Fe are preferably used.

In one embodiment, a copper wire may be used as the metal catalyst.

The metal catalyst template is placed in the furnace for a chemical vapor deposition. In the inside of the furnace, a vacuum state of less than 0.02 torr is formed by using a rotary pump.

The furnace is heated to at least 900° C. by using a rapid heating system. The temperature increases within 1 minute so as to prevent nonspecific oxidation.

In the next step, a residual oxide layer on the metal catalyst template is removed by flowing hydrogen gas (less than 100 sccm). The metal catalyst template is heated under a hydrogen atmosphere, and a carbon precursor gas (such as $CH_4$ or $C_2H_2$) is flowed. Growth pressure is maintained at less than 1 torr for graphene synthesis, and the synthesis is carried out within 1 minute.

The metal catalyst template, on which graphene has grown, may be cooled under a hydrogen environment for about 1 minute to about 4 minutes at room temperature.

After the metal catalyst template is taken out from the reactor, the metal catalyst template is placed in an etching solvent. The etching process is intended to dissolve the metal catalyst template and separate the formed three dimensional graphene structure from the template.

The etching solvent is not limited, and any etching solvent may be used if it can etch the metal catalyst template. For example, $FeCl_3$ or others may be used.

The etching process may be carried out for 1 hour or a few hours in accordance with volume of the metal catalyst template.

Since the three dimensional graphene structure formed through the foregoing steps has a high hydrophobic property, the three dimensional graphene structure floats on the etching solvent.

Accordingly, the three dimensional graphene structure floating on the etching solvent can be collected by using a Si or PET film.

A step of washing and drying the collected three dimensional graphene structure may be additionally carried out.

The washing process may be carried out, but not limited to, with deionized water one or more times.

The drying process may be carried out, but not limited to, by flowing nitrogen gas.

The three dimensional graphene structure fabricated through the foregoing steps may be a carbon nanotube, a graphene rod, a fullerene, a graphene cube, a graphene coil, or a graphene cuboid.

Length of the three dimensional graphene structures may be from a few nanometers to a few millimeters.

The present disclosure also relates to a method for controlling length of the three dimensional graphene structure, including a step of controlling length of a metal catalyst template for growing graphene on the metal catalyst template in a certain form.

The present disclosure uses a metal catalyst in a certain form as a substrate and template for graphene growth. Accordingly, the present disclosure is characterized by adjusting length of the three dimensional graphene structure that has grown on the template, by controlling length of the metal catalyst.

Length of the metal catalyst template for controlling length of the three dimensional graphene structure of the present disclosure is preferably from a few nanometers to a few millimeters.

Hereinafter, the present disclosure will be described in more detail with examples of the present disclosure. However, the scope of the present disclosure may not be limited to the examples.

EXAMPLE 1

Fabrication of Three Dimensional Graphene Structures

Graphene growth was carried out on a catalyst template. A copper wire having length of a few nanometers to a few millimeters was used for graphene tube synthesis. The copper wire as a substrate and template was placed in the inside of CVD furnace. In the inside of the furnace, a vacuum state of less than 0.02 torr was formed by using a rotary pump. The furnace was heated to at least 900° C. by using a rapid heating system, and the heating was accomplished within 1 minute. Thereafter, hydrogen gas (less than 100 sccm) was flowed such that a residual oxide layer on the template was removed. The template was heated under a hydrogen atmosphere for approximately 10 minutes, and a carbon precursor gas ($CH_4$ or $C_2H_2$) was flowed (approximately 50 sccm). Growth pressure was maintained at less than 1 torr for graphene synthesis. Graphene synthesis was carried out within 1 minute. After the growth, the template was cooled under a hydrogen environment within 4 minutes at room temperature. After the template was taken out from the reactor, the template was placed in the inside of the etching solvent ($FeCl_3$ solution). The etching process may be carried out for 1 hour to several hours in accordance with volume of the templates. The etching process dissolved the copper wire, and separated graphene tube from the template. The graphene structure may vary depending on the form of the catalyst template. For example, a copper rod and a copper sphere may grow rod-shaped graphene (carbon nano-tube) and a graphene sphere (fullerene), respectively. The separated graphene structures floated on the etching solvent due to its high hydrophobic property. The graphene structures floating on the solvent was collected by using a Si or PET film. After the graphene structure was washed by using deionized water and dried by flowing nitrogen gas, the graphene structures that can be applied for various purposes was obtained.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention.

The scope of the present invention is defined by the following claims rather than by the detailed description of the embodiments. It shall be understood that all modifications and embodiments conceived from the meaning and scope of the claims and their equivalents are included in the scope of the present invention.

What is claimed is:

1. A method for fabricating a three dimensional graphene structure, comprising:
    growing graphene from all dimensions of a metal catalyst template in a tube, a rod, a sphere, a cube, a coil, or a cuboid; and
    removing the template by dissolving the template on which graphene has grown, in an etching solvent,
    wherein a shape of the three dimensional graphene structure corresponds to the shape of the metal catalyst template and the three dimensional graphene structure includes a carbon nanotube, a graphene rod, a fullerene, a graphene cube, a graphene coil, or a graphene cuboid, and a length of each of the three dimensional graphene structure and the metal catalyst template is from a few nanometers to a few millimeters.

2. The method for fabricating a three dimensional graphene structure of claim 1, wherein the catalyst comprises a transition metal.

3. The method for fabricating a three dimensional graphene structure of claim 2, wherein the catalyst includes at least one selected from the group consisting of Cu, Ni, Co, and Fe.

4. The method for fabricating a three dimensional graphene structure of claim 1, wherein the graphene grows through a thermal chemical vapor deposition method.

5. The method for fabricating a three dimensional graphene structure of claim 1, wherein the method further comprises cooling the template on which graphene has grown, under a hydrogen environment at room temperature for 1 minute to 4 minutes.

6. The method for fabricating a three dimensional graphene structure of claim 1, wherein the etching solvent includes $FeCl_3$.

7. The method for fabricating a three dimensional graphene structure of claim 1, wherein the method further comprises collecting the three dimensional graphene structure floating on the etching solvent by using a Si or PET film.

8. The method for fabricating a three dimensional graphene structure of claim 7, wherein the method further comprises washing and drying the collected three dimensional graphene structure.

9. A method for controlling length of a three dimensional graphene structure comprising:

controlling length of a metal catalyst template for growing graphene from all dimensions of the metal catalyst template in a tube, a rod, a sphere, a cube, a coil, or a cuboid wherein a shape of the three dimensional graphene structure corresponds to the shape of the metal catalyst template and the three dimensional graphene structure includes a carbon nanotube, a graphene rod, a fullerene, a graphene cube, a graphene coil, or a graphene cuboid, and a length of each of the three dimensional graphene structure and the metal catalyst template is from a few nanometers to a few millimeters.

* * * * *